United States Patent [19]

Takahashi

[11] Patent Number: 5,695,307
[45] Date of Patent: Dec. 9, 1997

[54] FASTENING DEVICE

[75] Inventor: Kenji Takahashi, Toyota, Japan

[73] Assignee: Nifco Inc., Yokohama, Japan

[21] Appl. No.: 627,353

[22] Filed: Apr. 5, 1996

[30] Foreign Application Priority Data

Aug. 30, 1995 [JP] Japan .................. 7-243970

[51] Int. Cl.⁶ ............................................ F16B 19/00
[52] U.S. Cl. ...................... 411/508; 411/913; 411/482
[58] Field of Search ............................ 411/508, 509, 411/510, 908, 913, 485, 482, 41, 45–48

[56] References Cited

U.S. PATENT DOCUMENTS

| 504,133 | 8/1893 | Parkinson | 411/482 |
| 633,909 | 9/1899 | Sanford | 411/485 |
| 4,261,243 | 4/1981 | Palmer | 411/510 |
| 4,647,262 | 3/1987 | Yokota | 411/349 |
| 5,301,396 | 4/1994 | Benoit | 411/509 |

FOREIGN PATENT DOCUMENTS

| 54-59620 | 4/1979 | Japan . | |
| 224181 | 11/1924 | United Kingdom | 411/485 |

Primary Examiner—Flemming Saether
Attorney, Agent, or Firm—Kanesaka & Takeuchi

[57] ABSTRACT

A fastening device of the invention includes a head, a tool hole formed in the head, and a leg extending downwardly from a lower surface of the head and having engaging portions. The tool hole has at least one opening on a peripheral surface of the head. When the leg is inserted into a hole in a member to be jointed, the engaging portions engage the member. When the fastening device is removed from the member, a tool is directly inserted into the tool hole of the head to pull out the fastening device.

6 Claims, 4 Drawing Sheets

FASTENING DEVICE

BACKGROUND OF THE INVENTION AND RELATED ART STATEMENT

The present invention relates to a fastening device or a fastener, and more particularly, relates to a synthetic resin fastener used for fixing an interior member, such as a carpet and a panel as garnishes, of an automobile, to a body of the automobile.

As this kind of a fastener, an inner surface (lower surface) of a head, i.e. a jaw, is provided with a notch, as disclosed in Japanese Utility Model Publication (KOKAI) No. 54-59620. In this fastener, a leg portion is inserted into an attachment hole of an interior member, and the interior member is sandwiched between the inner surface of the head and a shoulder portion of the leg portion to be fixed. When the fastener is detached from the interior member, a distal end of a tool, such as a flat type screwdriver, is inserted between the notch in the inner surface of the head and a surface of the interior member, and the head is lifted up by utilizing a principle of a lever (the distal end of the screwdriver is a fulcrum, a portion abutting against the notch is a point of action, and a shaft of the screwdriver is a point of force). As a result, the shoulder portion of the leg passes through the attachment hole, so that the fastener can be pulled out from the attachment hole.

In the conventional fastener as described above, however, since the distal end of the tool is inserted into a space between the fastener and the interior member, upon insertion of the tool, there is a possibility that the distal end of the tool might scratch a surface of the interior member to thereby damage the same.

Also, since the fastener is pulled out from the attachment hole by the principle of the lever against the resisting force of the shoulder portion of the leg, as soon as the shoulder portion passes through an edge of the attachment hole, the resisting force is disappeared, so that the pulled-out fastener might be thrown or fly away somewhere by an excessive force and might be lost.

In view of the foregoing, an object of the present invention is to provide a fastening device, which can prevent a surface of an attached member from being damaged in case the fastener is pulled out from the attached member, such as an interior member.

Another object of the invention is to provide a fastening device as stated above, which is not lost when the fastening device is pulled out.

Further objects and advantages of the invention will be apparent from the following description of the invention.

SUMMARY OF THE INVENTION

The present invention has been made to achieve the foregoing objects. In a first aspect of the invention, there is provided a fastening device formed of a head, and a leg extending from a lower surface of the head and having engaging portions which engage a member to be attached to increase pulling resistance when the fastening device is engaged with the member. In the fastening device, the head is provided with a tool inserting hole formed between a bottom portion located at a side of the leg and a ceiling portion spaced apart from the bottom portion. The tool inserting hole has an opening at an outer periphery of the head at least at one side thereof.

When the fastening device is attached to the member, the fastening device is simply inserted into a hole of the member to be attached, as in a conventional fastening device. When the fastening device is detached from the member, a tool, such as a flat type screw driver, is inserted into the tool inserting hole, and the fastening device is pulled together with the tool. Since the tool does not touch the member, the member is not damaged by the tool.

According to a second aspect of the present invention, the tool inserting hole is structured such that a space between the bottom portion and the ceiling portion gradually decreases as a distance from the opening toward an inside of the tool inserting hole increases.

As a result, when the screwdriver is inserted into the tool inserting hole, the screwdriver surely engages the tool inserting hole. Accordingly, when the fastening device is removed from the member, the fastening device is not accidentally separated from the tool. Thus, the fastening device is not lost or thrown away.

DETAILED DESCRIPTION OF PREFERRED EMBODIMENTS

Figure 1:
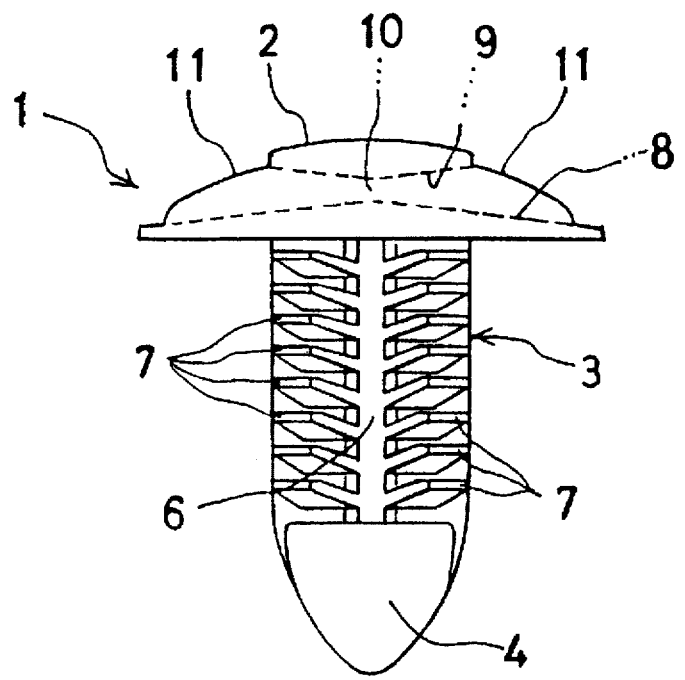
FIG. 1 is a front view of a fastening device according to an embodiment of the present invention.
Figure 2:
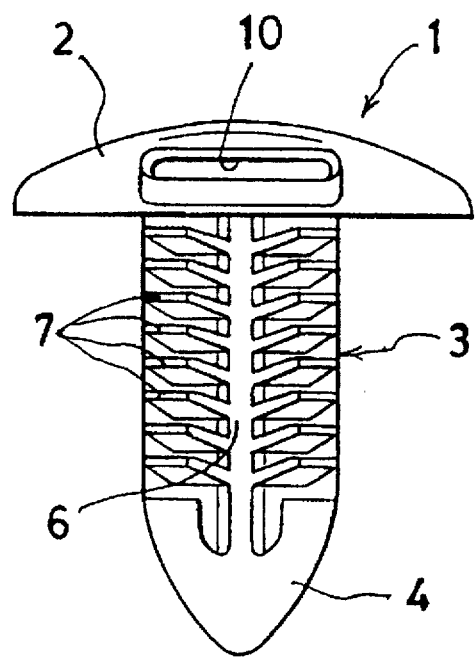
FIG. 2 is a side view of the fastening device.
Figure 3:
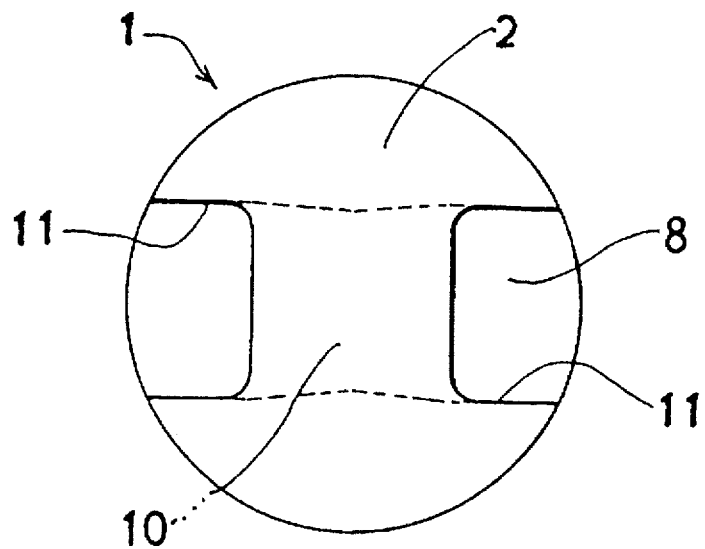
FIG. 3 is a top plan view of the fastening device.
Figure 4:
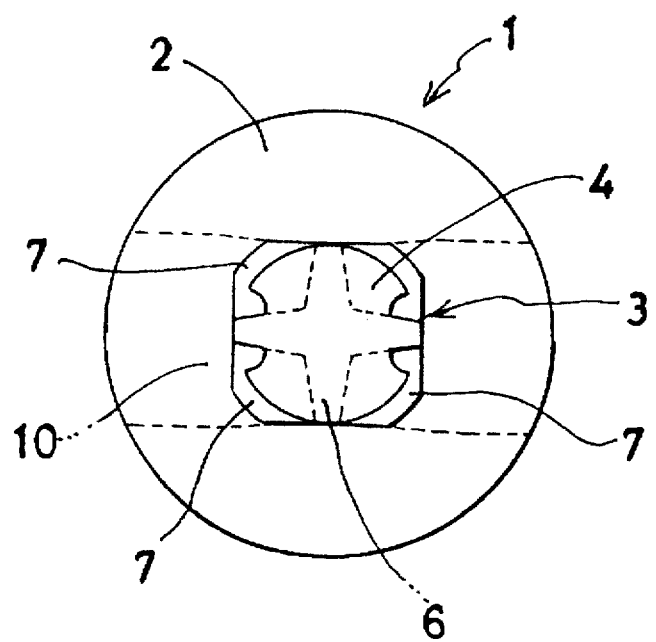
FIG. 4 is a bottom plan view of the fastening device.

An embodiment of the present invention is described hereinafter with reference to the drawings. FIG. 1 is a front view of a fastening device or a fastener; FIG. 2 is a side view of the fastener shown in FIG. 1; FIG. 3 is a top plan view thereof; and FIG. 4 is a bottom plan view thereof.

A fastener 1 of the invention comprises a substantially circular head 2, and a leg portion 3 vertically extending from a lower surface of the head 2, which are integrally formed by a synthetic resin.

In order to facilitate insertion of the leg 3 into an attachment hole of a member to be attached, a tapered end portion 4 having a diameter gradually decreased toward a distal end is formed in the leg 3, and between the tapered end portion 4 and the head 2, there are provided engaging portions 7 engaging the attached member to increase pulling resistance. The engaging portions 7 shown in the figures are formed of a plurality of elastic pieces extending outwardly from a rod 6 of the leg 3. The elastic pieces 7 are integrally formed with the rod 6 and are spaced apart from each other with a predetermined pitch therebetween along the entire length of the rod 6.

In order to decrease the insertion resistance and to increase the pulling resistance of the leg, each elastic piece 7 is arranged such that a projecting distal end is inclined or curved toward the head 2 relative to a base end thereof. Also, as shown in FIG. 4, the elastic pieces 7 have a length slightly larger than a diameter of the tapered end portion 4.

On the other hand, the head 2 is provided with a tool inserting hole 10 formed between a bottom portion 8 located on a side of the leg 3 and a ceiling portion 9 spaced apart from the bottom portion 8. At least one end of the tool inserting hole 10 is opened toward an outer periphery of the head 2 to have an opening. The tool inserting hole 10 as shown in the figures has two notches 11 at the upper and side surfaces of the head 2 to face against each other relative to a center of the head. The notches 11 communicate with each other to define a flat tunnel in the head 2. The inner size of the hole 10 is determined with reference to a size of the tool to be inserted thereinto.

Also, as shown in the figures, the bottom portions 8 of the notches 11 gradually incline or ascend from the outer periphery of the head 2 to the center thereof. On the other hand, the ceiling portion 9 of each notch 11 gradually descends from an edge of the opening toward the center of the head 2. Therefore, there is provided the tool inserting hole 10, which is wide at an entrance and has a space between the top and bottom gradually decreasing toward the center of the head 2. Also, the width of the hole 10 gradually decreases from the edge of the opening toward the center of the head 2.

Figure 5:
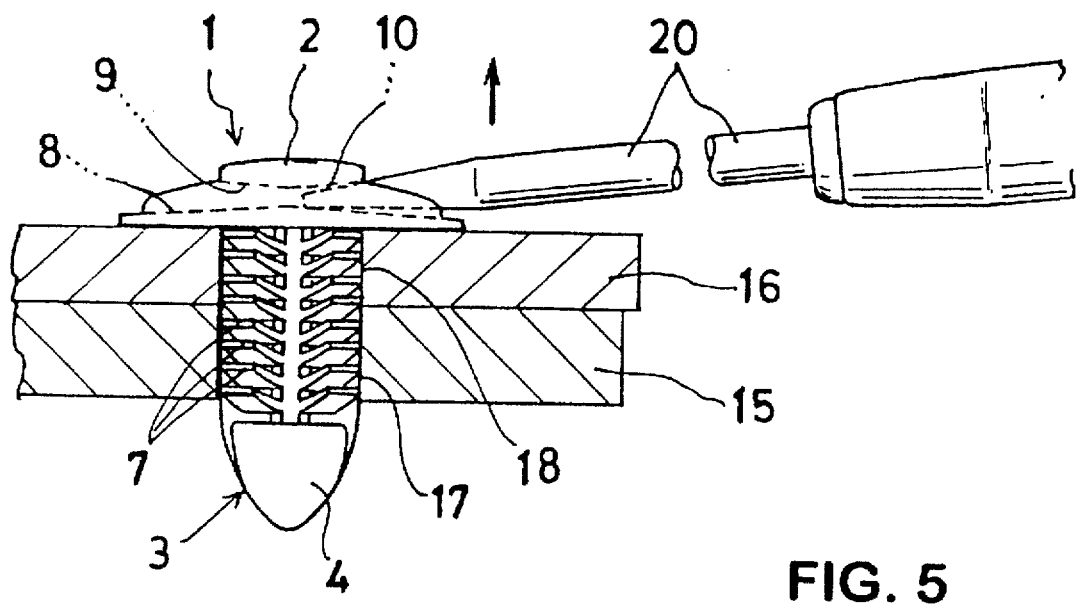
FIG. 5 is a front view showing a state such that a flat type screwdriver as a tool is inserted into a tool inserting hole of the fastening device fixed to members to be attached.

In case the fastener 1 formed as mentioned above is used for attaching the member, for example, when a panel 16 is attached to a body 15 as shown in FIG. 5, an attachment hole 17 of the body 15 and an attachment hole 18 of the panel 16 are aligned together, and then the tapered end portion 4 of the leg 3 of the fastener 1 is inserted into the holes 17, 18. Since the distal end of the leg 3 is provided with the tapered end portion 4 having the diameter gradually increasing from the distal end, even if the attachment hole 17 of the body 15 deviates more or less from the attachment hole 18 of the panel 16, the leg 3 can be easily inserted into the holes 17, 18.

When a middle portion of the leg 3 is inserted into the holes 17, 18, since the projecting distal ends of the elastic pieces 7 are inclined or curved toward the head 2, the elastic pieces 7 by themselves can be bent easily. Thus, the leg 3 can be easily inserted. When the leg 3 is sufficiently inserted such that the lower surface (an inner surface) of the head 2 abuts against the surface of the panel 16, the elastic pieces 7 engage the inner peripheries of the attachment holes 17, 18 with pressure.

When a force is applied in a direction that the leg 3 is pulled out from the attachment holes 17, 18, the force acts onto the elastic pieces in a direction opposite to a direction that the elastic pieces 7 are bent. Therefore, the pulling resistance increases more than the insertion resistance to thereby prevent the fastener from being pulling out. Thus, even if vibration is applied to the panel 16, the fastener 1 is prevented from being pulled out unexpectedly.

Also, in case the panel 16 is required to be detached by reason of fixing a mechanical trouble or the like, namely, in case the fastener 1 is required to be pulled out, as shown in FIG. 5, a distal end of a tool 20, such as a flat type screwdriver, is inserted into the tool inserting hole 10 along the bottom portion 8 of the notch 11. In this case, since the width at the front of the tool inserting hole 10 is wide, the distal end of the tool 20 is smoothly inserted. However, since the space between top and bottom of the inserting hole 10 is gradually decreased, the tool 20 becomes a condition like a wedge applied to a space, so that the tool 20 surely engages the fastener 1. Then, the tool 20 is manipulated to apply the force working upwardly to the fastener 1, so that the fastener 1 is gradually lifted up against the engagement force of the elastic pieces 7 formed at the leg 3, and finally the fastener is pulled out from the attachment holes 17, 18.

As described above, in case the fastener 1 is pulled out from the attachment holes 17, 18, the distal end of the tool 20 does not touch the surface of the panel 16, so that the tool 20 never damages the panel 16.

Figure 6:
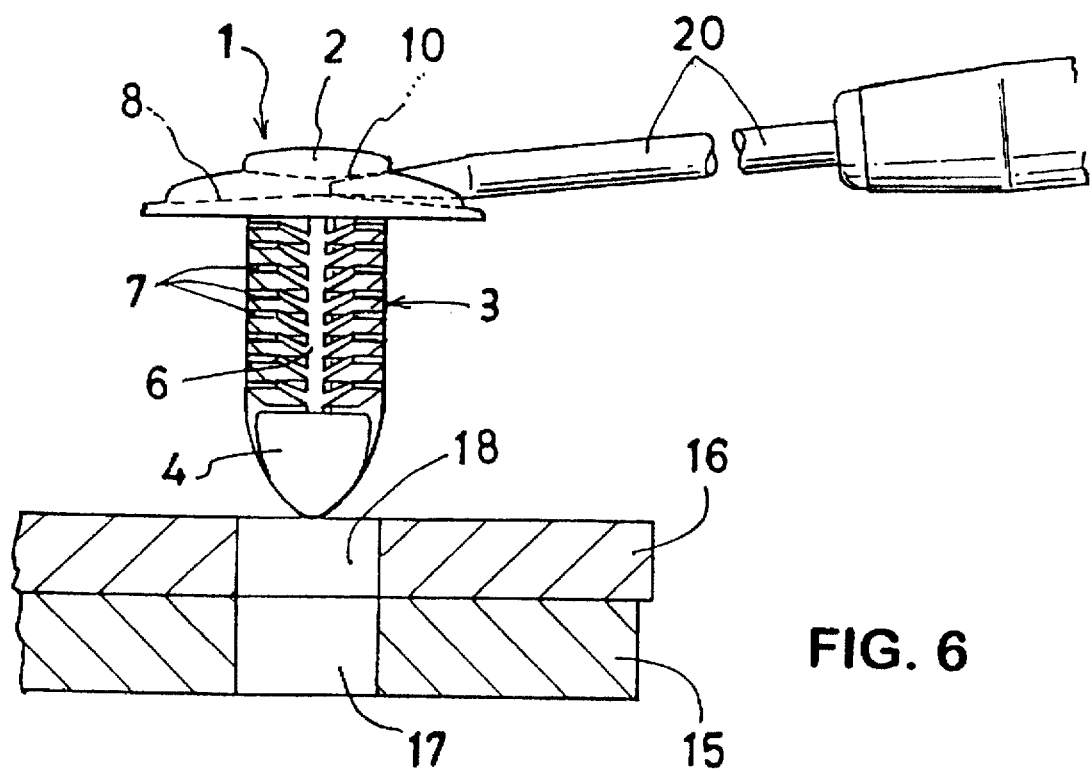
FIG. 6 is a front view showing a state such that the fastening device shown in FIG. 5 is pulled out from the attachment hole of the members.

Also, when the engagement force of the elastic pieces 7 disappears and the fastener 1 is pulled out from the attachment holes 17, 18, an excessive upward force is applied to the fastener 1. However, the distal end of the tool 20 is inserted into the tool inserting hole 10, and firmly engages the tool inserting hole 10. Thus, the fastener 1 pulled out from the attachment holes 17, 18 remains at the distal end of the tool 20 as shown in FIG. 6. Therefore, there is no possibility to scatter or throw the fastener 1, and lose the same.

Incidentally, although the tool inserting hole 10 of the invention in the aforementioned embodiment is formed to have a tunnel communicating with both sides of the head 2, the hole 10 need not be limited in this shape. The inserting hole may have any shape if the hole is defined between the bottom portion 8 located in the side of the leg 3 and the ceiling portion 9 spaced apart from the bottom portion 8, wherein at least one end of the hole is opened toward the outer periphery of the head 2. For example, the hole may be a concave orienting laterally, wherein the concave extends up to the middle portion of the head 2 without entirely passing through the head 2 and the opening is formed at one side of the head 2. Also, the hole may have an opening at a side surface of the head 2 without the notches 11.

Figure 7:
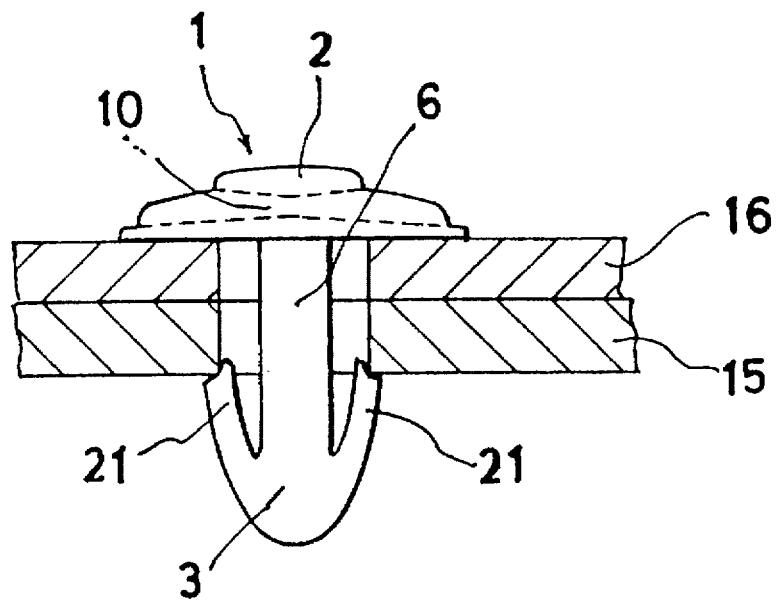
FIG. 7 is a front view of a fastening device according to a different embodiment of the present invention.
Figure 8:
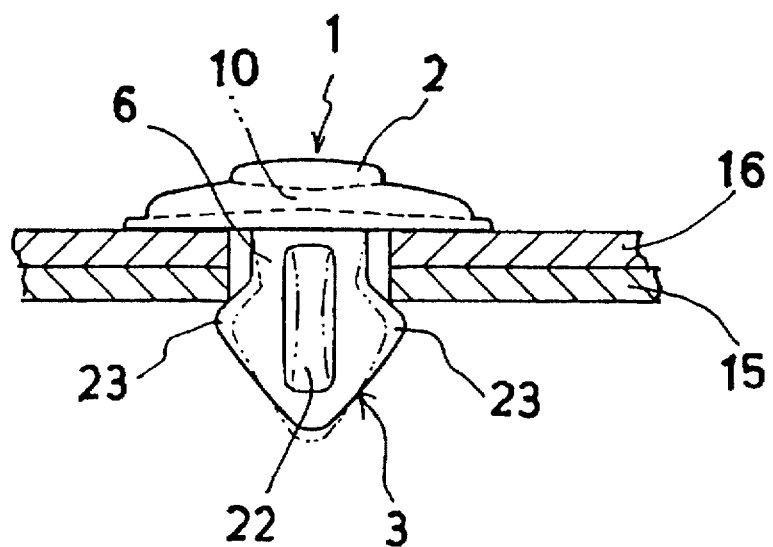
FIG. 8 is a front view of a fastening device according to a further different embodiment of the present invention, wherein a rod having a hollow portion includes engaging portions with protruded shoulder portions at both sides of the rod.

Also, the engaging pieces of the leg 3 are not limited to the aforementioned elastic pieces 7 as long as the engaging portions engage the member and increase the pulling resistance. For example, in an alternative embodiment of the engaging portion as shown in FIG. 7, elastic engaging pieces 21 in a substantial V-shape are formed to incline from a lower end (distal end) of the rod 6 to the side of the head 2, and an upper end of the elastic piece 21 is provided with an engaging step or a slope portion sloping in a direction opposite to the inclination of the elastic piece. Thus, the engaging portion has an anchor-like shape. Also, as a further alternative embodiment of the engaging portion, as shown in FIG. 8, a mid-portion of the rod 6 includes a hollow portion 22, and shoulder portions 23 are formed at a side portion of the rod, wherein the diameter of the shoulder portions 23 can be decreased or deformed.

As described above, according to the present invention, a tool inserting hole defined between the bottom portion located at the side of the leg and the ceiling portion spaced apart from the bottom portion and having at least one opening toward the outer periphery of the head is formed at the head. Therefore, in case the fastener is pulled out from the attachment hole of the member, the tool can be directly inserted into the tool inserting hole to pull out the fastener. Also, since the tool does not touch the attached member, when the tool is used, there is no possibility of damaging a surface of the member, such as an interior member.

Also, since the fastener pulled out from the attachment hole is held at the distal end of the tool, there is no possibility of throwing and losing the pulled-out fastener unexpectedly. Therefore, the fastener which was pulled out can be used again.

Also, according to the second aspect of the invention, since the tool inserting hole is formed to have a gradually decreased height from the opening toward the inside of the hole, the tool can securely engage the fastener. Therefore, the pulled-out fastener is not unexpectedly thrown away.

While the invention has been explained with reference to the specific embodiment of the invention, the explanation is illustrative and the invention is limited only by the appended claims.

What is claimed is:

1. A fastening device adapted to join to a member with a hole, comprising:

one head having an upper surface, a substantially flat lower surface, and a peripheral surface extending between the upper and lower surfaces;

a leg extending downwardly from the lower surface of the head and having engaging portions adapted to tightly engage the hole in the member; and a tool hole formed in the head and having at least one opening at the peripheral surface of the head and a space defined by a flat bottom portion and a flat ceiling portion, said space at the opening being larger than that at an inner portion of the head, said tool hole extending radially inwardly toward a central axis of the leg from the opening formed in the peripheral surface adapted to receive a removal tool into the tool hole.

2. A fastening device according to claim 1, wherein said hole has two openings, each being formed in a shape of a notch extending from the upper and peripheral surfaces of the head, said notches being located opposite to each other relative to a central axis of the leg and communicating with each other to define the tool hole.

3. A fastening device according to claim 2, wherein said leg is formed of a rod, said engaging portions being formed of a plurality of elastic pieces extending outwardly from the rod, each elastic piece having a distal end sloping toward the head.

4. A fastening device according to claim 2, wherein said leg is formed of a rod having a hollow portion therein, and said engaging portions protrude outwardly from the rod so that when the engaging portions are pushed toward the rod, the hollow portion deforms and collapses.

5. A fastening device according to claim 1, wherein said head has a dent forming the tool opening, said dent extending into a hole portion of the tool hole.

6. A combination of a fastening device adapted to join to a member with a hole and a removal tool for removing the fastener from the member, said fastening device comprising:

one head having an upper surface, a substantially flat lower surface, and a peripheral surface extending between the upper and lower surfaces;

a leg extending downwardly from the lower surface of the head and having engaging portions, said engaging portions being adapted to engage the member when said leg is inserted into the hole in the member; and a tool hole formed in the head and having at least one opening at the peripheral surface of the head and a space defined by a flat bottom portion and a flat ceiling portion, said space at the opening being larger than that at an inner portion of the head, said tool hole having a size to receive the removal tool therein and extending radially inwardly toward a central axis of the leg from the opening formed in the peripheral surface so that when the fastening device attached to the member is removed, the removal tool can be easily inserted into and surely held in the tool hole to facilitate removal of the fastening device.

* * * * *